(12) United States Patent
Cui et al.

(10) Patent No.: US 10,711,870 B1
(45) Date of Patent: Jul. 14, 2020

(54) LINEAR-TO-ROTARY ACTUATOR

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 16/701,102

(22) Filed: Dec. 2, 2019

(51) Int. Cl.
  *F16H 19/02* (2006.01)
  *F16H 19/06* (2006.01)
  *F16H 57/023* (2012.01)
  *F16H 19/04* (2006.01)

(52) U.S. Cl.
  CPC ......... *F16H 19/0659* (2013.01); *F16H 19/04* (2013.01); *F16H 57/023* (2013.01); *F16H 2019/046* (2013.01)

(58) Field of Classification Search
  CPC ........ F16H 25/14; F16H 57/023; F16H 57/02; F16H 19/0659; B25J 17/0241
  USPC .......................................................... 74/25
  See application file for complete search history.

(56) References Cited

U.S. PATENT DOCUMENTS

| | | | |
|---|---|---|---|
| 2,871,723 A | 2/1959 | Shephard | |
| 4,712,437 A | 12/1987 | Gaigl | |
| 6,840,166 B2 * | 1/2005 | Jeter | B41F 17/002 101/247 |
| 9,027,423 B1 * | 5/2015 | Cui | F16H 25/20 74/53 |
| 9,103,419 B2 | 8/2015 | Cui et al. | |
| 9,303,741 B2 | 4/2016 | Cui et al. | |
| 10,041,572 B2 | 8/2018 | Cui et al. | |
| 2012/0312107 A1 | 12/2012 | Lestienne et al. | |
| 2016/0215863 A1 | 7/2016 | Cao et al. | |
| 2017/0016519 A1 * | 1/2017 | Cui | F16H 25/14 |

FOREIGN PATENT DOCUMENTS

GB 2267548 A 12/1993

OTHER PUBLICATIONS

"Rotary to linear drive"; printed from https://www.thingiverse.com/thing:1098809; Oct. 29, 2015.

* cited by examiner

*Primary Examiner* — Randell J Krug
(74) *Attorney, Agent, or Firm* — Richard C. Litman; Nath, Goldberg & Meyer

(57) ABSTRACT

The linear-to-rotary actuator is a device that has two rotors at opposite ends of a main housing tube, the rotors being driven to rotate by a slider disposed between the rotors, the slider being attached to the piston of a linear actuator. The device may be configured so that angular displacement between the rotors may be adjusted for use with apparatus that may require variable angular displacement between articulated segments, such as a robotic arm, the arm of an excavator or crane, and the like. In one embodiment, the device has rollers mounted on opposite sides of the slider that engage tracks defined in adaptors selectively coupled to the rotors by "boltless" connectors. In another embodiment, the device has gear trains driven by the slider that are coupled to the rotors for multiplying angular displacement between the rotors.

10 Claims, 9 Drawing Sheets

US 10,711,870 B1

LINEAR-TO-ROTARY ACTUATOR

BACKGROUND

1. Field

The disclosure of the present patent application relates to mechanisms for converting linear motion to rotary motion, and particularly to a linear-to-rotary actuator that is capable of converting a sliding linear motion simultaneously to two different rotary motions over different angular displacements, depending upon the configuration of the output rotors.

2. Description of the Related Art

Converters for converting linear motion to rotary motion can be found in a wide array of different technologies and industries, ranging from artificial limb joints to robotics to steering assemblies. Although many types of linear-to-rotary converters and actuators are known, very few such converters and actuators can be used universally, i.e., such converters and actuators are typically designed for one particular purpose or application. Further, such converters and actuators often rely on complex mechanical couplings, typically including a variety of gears, cams, chains, belts and the like. Such complex systems are susceptible to misalignment and other causes of mechanical failure. They are also difficult to repair, since removal and replacement of individual parts can be difficult and time-consuming.

Moreover, many linear-to-rotary actuators are configured to impart rotary motion to a single device, or when configured to impart rotary motion simultaneously to two devices from a single linear movement, the rotary motion is at the same angular speed or displacement. Thus, a linear-to-rotary actuator solving the aforementioned problems is desired.

SUMMARY

The linear-to-rotary actuator is a device that has two rotors at opposite ends of a main housing tube, the rotors being driven to rotate by a slider disposed between the rotors, the slider being attached to the piston of a linear actuator. The device may be configured so that angular displacement between the rotors may be adjusted for use with apparatus that may require variable angular displacement between articulated segments, such as a robotic arm, the arm of an excavator or crane, and the like. In one embodiment, the device has rollers mounted on opposite sides of the slider that engage tracks defined in adaptors selectively coupled to the rotors by "boltless" connectors. In another embodiment, the device has gear trains driven by the slider that are coupled to the rotors for multiplying angular displacement between the rotors.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
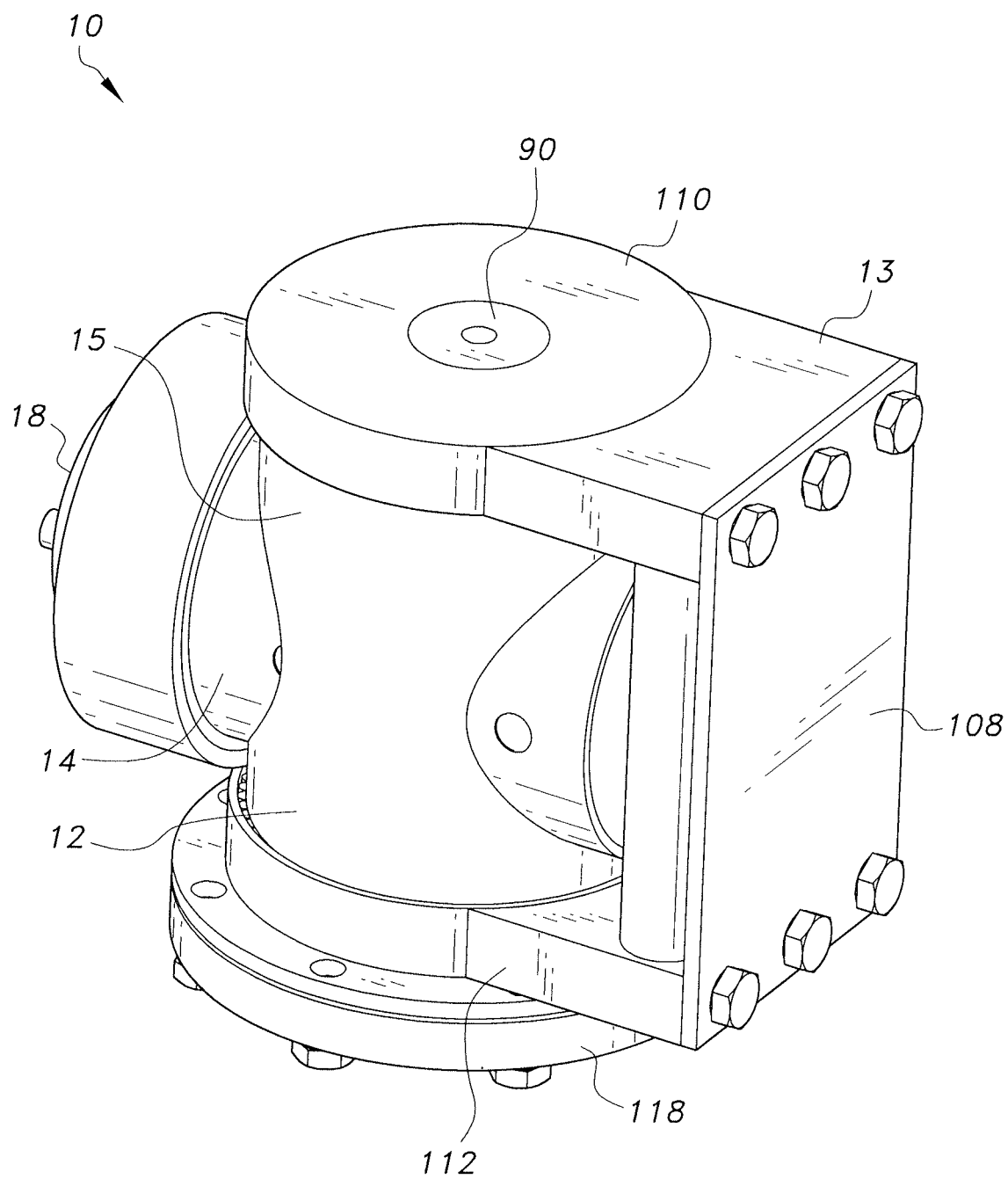
FIG. 1A is a perspective view of a linear-to-rotary actuator as viewed with the outer wall of the saddle rotor on top.

The linear to-rotary actuator has a housing including an elongated main tube and an elongated linear motion tube orthogonal to the main tube. A cylindrical slider is constrained to linear translational movement in the linear motion tube, the linear translational movement being selectively activated by a linear actuator having a piston fixed to the cylindrical slider. The cylindrical slider has a first pair of coaxially mounted rollers extending to opposite sides of the slider at the main tube and a second pair of coaxially mounted rollers extending to opposite sides of the slider at the main tube, the first and second pairs being spaced apart.

In a first embodiment, a first linear-to-rotary adapter is disposed inside the main tube on one side to the linear motion tube. The linear-to-rotary adaptor has a pair of symmetrical guide tracks or slots defined therein, at least one of the rollers being seated in one of the guide tracks so that linear movement of the slider is converted into rotary movement of the first linear-to-rotary adaptor. An output flange is fixed to the first linear-to-rotary adaptor, the output flange having a coupler extending therefrom. A base rotor comprising a circular disk is selectively attached to the coupler of the output flange attached to the first linear-to-rotary adaptor.

A second linear-to-rotary adapter is disposed inside the main tube on the opposite side from the first linear-to-rotary adaptor. The second linear-to-rotary adaptor has a pair of symmetrical guide tracks or slots defined therein, at least one of the rollers being seated in one of the guide tracks so that linear movement of the slider is converted into rotary movement of the second linear-to-rotary adaptor. A second output flange is fixed to the second linear-to-rotary adaptor, the second output flange having a coupler extending therefrom. A saddle rotor comprising an outer wall, a medial wall parallel to the outer wall, and an intermediate wall connecting the outer wall and the medial wall, thereby defining a U-shaped saddle, is selectively attached to the coupler of the second output flange by a fitting extending from the outer wall into the housing. The medial wall defines an annulus dimensioned and configured for encompassing the main housing tube, the annulus being lined with a plurality of roller bearings so that when the second linear-to-rotary adaptor is induced to rotate by linear movement of the slider in the linear motion tube, the entire saddle rotor rotates about the main housing tube until rotation is blocked by the linear motion tube.

The linear-to-rotary actuator may be configured to operate in different modes by selective coupling of the output flanges to the two rotors, by selective attachment of the two rotors to each other, and by selective attachment of the slider rollers to the tracks defined in the linear-to-rotary adaptors. The different modes control the angular displacement that occurs by rotation of one or both rotors. In mode 1, there is no connection between the two rotors so that the rotors operate independently. If the slider roller for one of the linear-to-rotary adaptors is attached to the anterior track and the slider roller for the other linear-to-rotary adaptor is attached to the posterior roller, the rotors will rotate in opposite directions and the angular displacement will be twice the displacement that would occur is both rollers were attached to either the anterior track or the posterior track. In mode 2, the base rotor may be attached to the saddle rotor by fasteners attached circumferentially to the base rotor and an annular flange surrounding the annulus in the medial wall so that the base rotor and the saddle rotor rotate in the same direction through the same arc.

The ability to adjust the configuration of the linear-to-rotary actuator to control angular displacement between the two rotors renders the device suitable for use as a pivot joint between articulating segments of a robotic arm, the arm of an excavator or crane, and other applications employing an articulated arm requiring precise angular displacements between articulated segments that can be controlled by hydraulic cylinders, pneumatic cylinders, electrical linear actuators, solenoids, or the like.

Figure 1B:
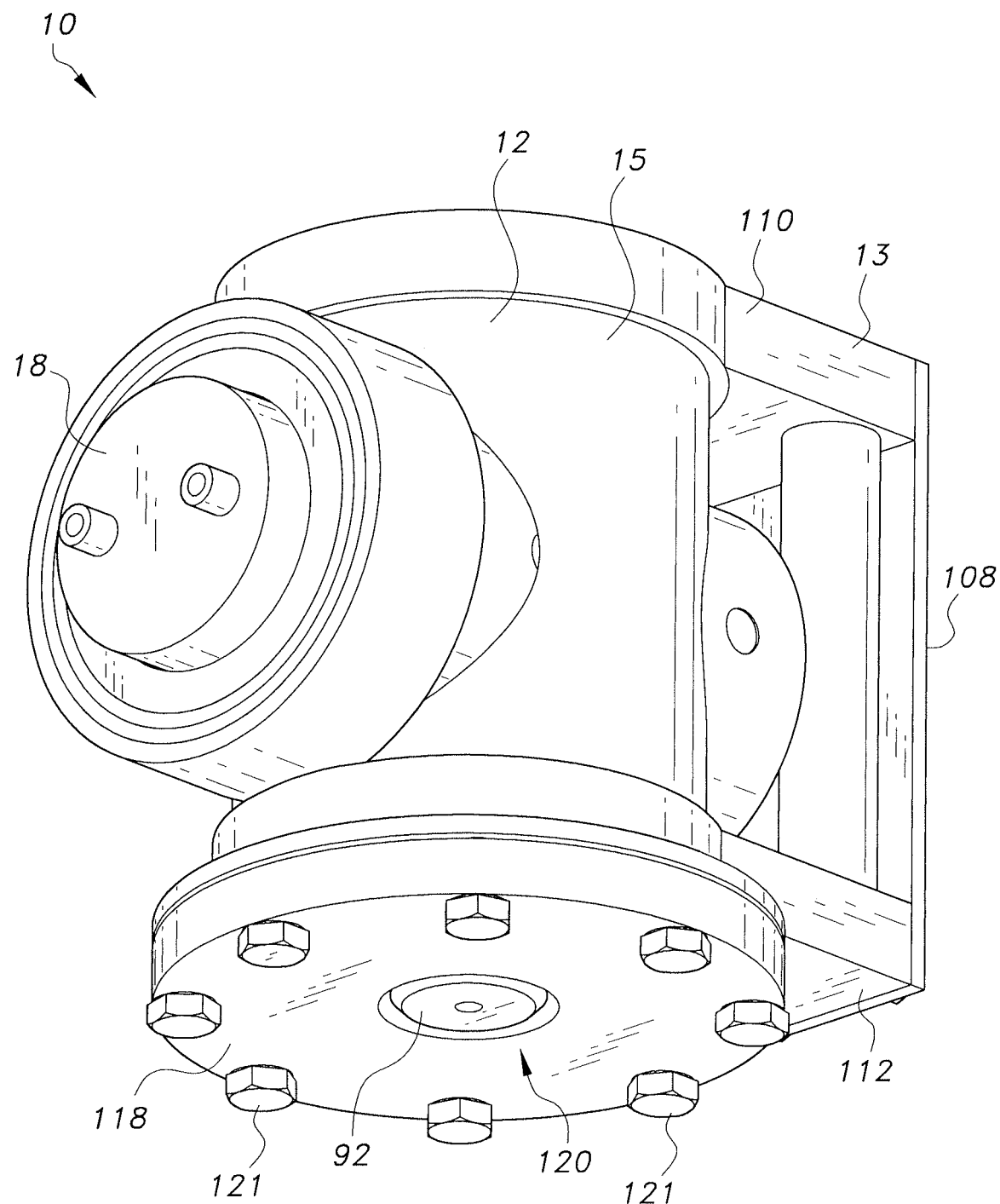
FIG. 1B is a perspective view of the linear-to-rotatory actuator as viewed with the base rotor on the bottom the bottom.
Figure 2:
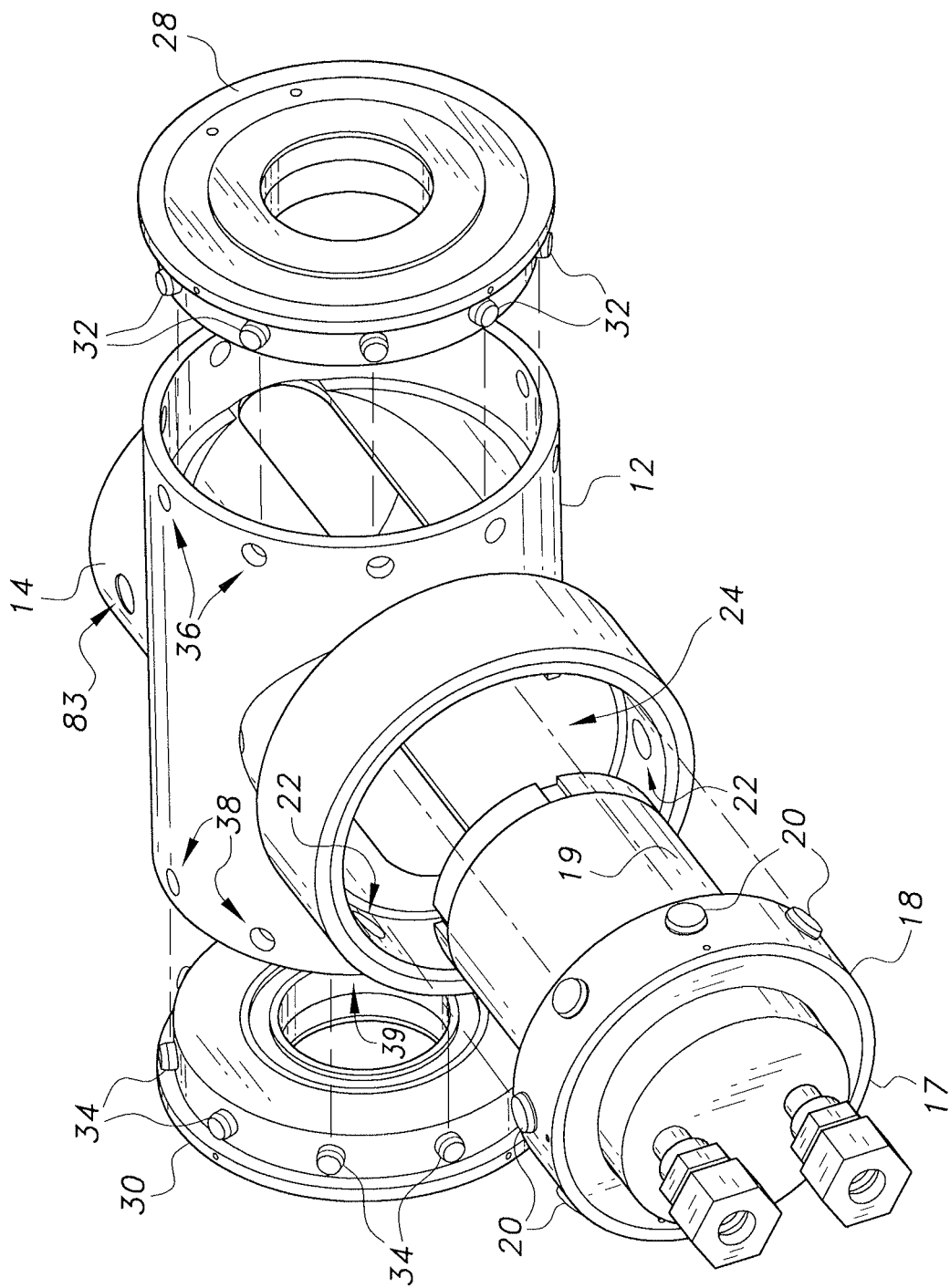
FIG. 2 is a partially exploded perspective view of the linear-to-rotary actuator of FIG. 1A.

Referring to FIGS. 1A, 1B and 2, the linear-to-rotary actuator 10 includes a housing 15 having a main tube 12 and a linear motion tube 14 orthogonal to the main tube 12. The actuator 10 has a base rotor 118 disposed at one end of the main tube 12 and a saddle rotor 13 having an outer wall 110, a medial wall 112 parallel to the outer wall 110, and an intermediate wall 108 connecting the outer wall 110 and the medial wall 112, thereby defining a U-shaped saddle. The outer wall 110 of the saddle rotor 13 is disposed at the end of the main tube 12 opposite the base rotor 118. It will be understood that the fasteners 121 shown connecting the base rotor 118 to the medial wall 112 of the saddle rotor 13 in FIG. 1B are optional and are only installed in configurations in which it is desired that the base rotor 118 and the saddle rotor 13 rotate together as a single unit. Otherwise, the fasteners 121 are omitted so that the base rotor 118 and the saddle rotor 13 may rotate independently. It will further be understood that the second rotor is only shown as a saddle rotor 13 to illustrate that the rotors 118, 13 need not have the same configuration. The second rotor may also be a circular disk of the same configuration as the base rotor 118, although the saddle configuration of the saddle rotor 13 does help to resist bending forces exerted on the main housing tube 12 by the linear actuator and slider assembly.

Figure 3:
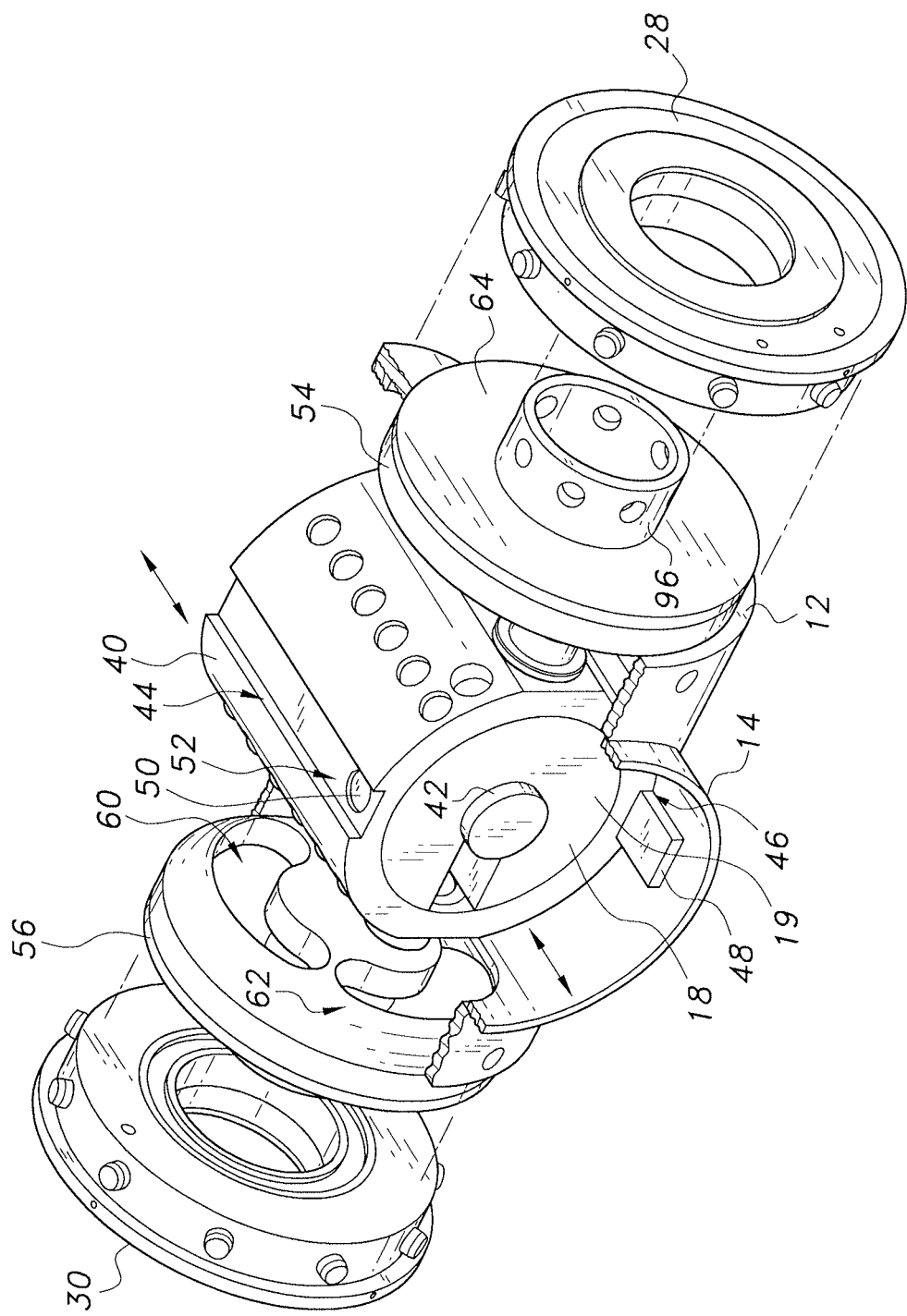
FIG. 3 is a partially exploded perspective view of the linear-to-rotary actuator of FIG. 1A with portions of the housing broken away.
Figure 4:
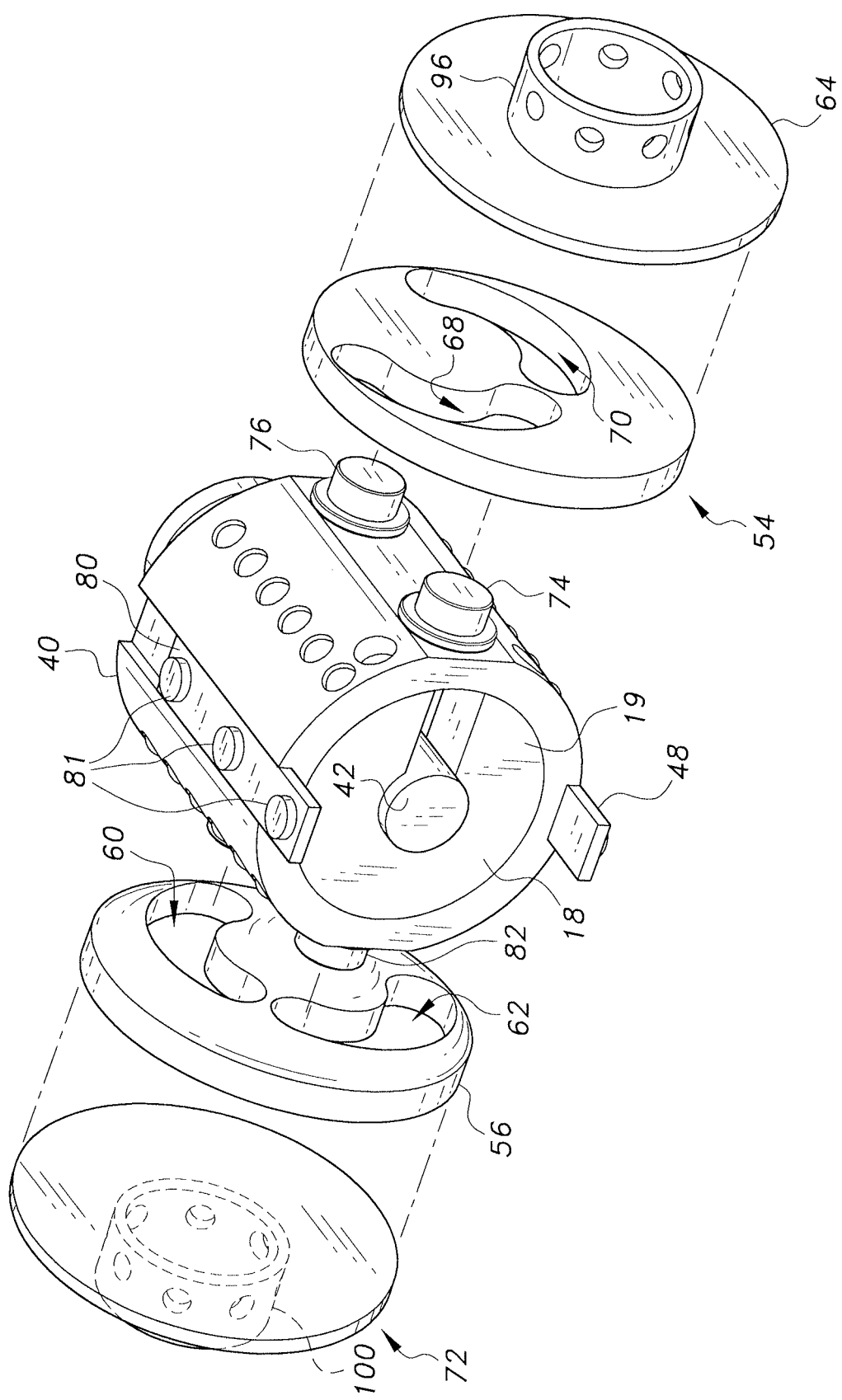
FIG. 4 is an exploded perspective view of the slider and linear-to-rotary adaptor assemblies of the linear-to-rotary actuator of FIG. 1A.

As shown in FIG. 3, a cylindrical slider 40 is axially slidable within the linear motion tube 14. The cylindrical slider 40 is constrained to linear movement within the linear motion tube 14, i.e., the cylindrical slider 40 is constrained so that it cannot rotate about its axis. In order to constrain the cylindrical slider 40 to this linear movement, at least one key 48 may be mounted on an inner surface of the linear motion tube 14. The at least one key 48 is slidably received within a keyway 46 formed in an outer surface of the cylindrical slider 40. In FIG. 3, for purposes of illustration, the linear motion tube 14 is shown broken away. Thus, only the bottom portion (in the orientation of FIG. 3) of the linear motion tube 14 is shown in FIG. 3. The partial view of FIG. 4 shows a second key 80, which would be mounted to the inner surface of the linear motion tube 14, diametrically opposite from key 48. The second key 80 would be received within keyway 44 (shown in FIG. 3). In FIG. 4, key 80 is shown with a plurality of engaging members 81. Engaging members 81 may be received by corresponding apertures 83 (shown in FIG. 2) formed in the linear motion tube 14 for secure mounting of the key 80 to the inner surface of the linear motion tube 14. A similar method of attachment may be used to attach key 48 to the inner surface of the linear motion tube 14, although it should be understood that the keys 48, 80 may be mounted using any suitable method of attachment, e.g., friction fit. Further, although the linear motion tube 14 and the main tube 12 are shown having cylindrical contours, it should be understood that the linear motion tube 14 and the main tube 12 may be replaced by tubes having square or rectangular cross sections. In this particular example, the cylindrical slider 40 would also be replaced by a slider having a square or rectangular transverse cross section, thus removing the need for additional constraining of the rotational movement of the slider 14.

As shown in FIG. 2, a fixed portion 17 of a linear actuator 18 is secured to a first open end 24 of the linear motion tube 14. In FIG. 2, locking members 20 are shown on the fixed portion 17 of the linear actuator 18 for reception by corresponding recesses 22, which are formed circumferentially about the inner face of the first end 24 of the linear motion tube 14. Although it should be understood that the linear actuator 18 may be secured to the first end 24 of the linear motion tube 14 using any suitable method of attachment, in the example of FIG. 2, locking members 20 engage recesses 22 to form a "boltless" connection, such as that described in U.S. Pat. Nos. 9,103,419 and 10,041,572, each of which is hereby incorporated by reference in its entirety, and as further described below in FIGS. 6A and 6B.

A movable portion 19 of the linear actuator 18, which includes piston 42, extends into the cylindrical slider 40 to selectively drive linear movement of the cylindrical slider 40 through the linear motion tube 14. In FIG. 3, at least one engaging member 50 is shown extending into at least one opening 52 formed in the cylindrical slider 40 to secure the movable portion 19 of the linear actuator 18 to the cylindrical slider 40. However, it should be understood that the movable portion 19 of the linear actuator 18 may be secured to the cylindrical slider 40 using any suitable method of attachment, thus allowing the linear actuator 18 to drive the sliding movement of the cylindrical slider 40 through the linear motion tube 14.

As shown in FIGS. 3 and 4, at least two diametrically opposed rollers extend from the cylindrical slider 40. In FIG. 4, a pair of rollers 74, 76 are shown mounted on one side of cylindrical slider 40 and a further roller 82 can be seen diametrically opposite roller 74, the rollers 82 and 74 being coaxially mounted. It should be understood that an additional coaxially mounted roller extends diametrically opposite roller 76, such that for each roller on one side of the cylindrical slider 40, a corresponding roller extends symmetrically from the opposite side of the cylindrical slider 40. Further, although two such rollers extend from each side of the cylindrical slider 40 in this example, it should be understood that any suitable number may be used, depending upon the configuration of the first and second linear-to-rotary adaptors 54, 56, as will be described in greater detail below.

The first linear-to-rotary adaptor 54 is a disk having an output flange 64 affixed thereto, and the second linear-to-rotary adaptor 56 similarly is a disk having an output flange 72 affixed thereto. The first linear-to-rotary adaptor 54 has at least one track, slot, or groove formed therein for receiving a corresponding at least one of the at least two spaced rollers 74, 76. Thus, in the example of FIGS. 3 and 4, where two corresponding rollers 74, 76 are provided extending from one side of the cylindrical slider 40, the first linear-to-rotary adaptor 54 has two such slots 68, 70 formed therein. Similarly, in this example, the second linear-to-rotary adaptor 56 has two tracks or slots 60, 62 formed therein for engaging the corresponding rollers extending from the opposite side of the cylindrical slider 40. Each of the tracks 60, 62, 68, 70 may form a portion of an Archimedean spiral in order to efficiently and effectively transfer linear motion to rotary motion, as discussed in U.S. Pat. No. 9,303,741, which is hereby incorporated by reference in its entirety.

The output flange 64 of the first linear-to-rotary adaptor 54 has a coupler 96 mounted thereto. Similarly, the output flange 72 of the second linear-to-rotary adaptor 56 has a coupler 100 mounted thereto. Although each of couplers 96, 100 is shown as a cylindrical shell, it should be understood that the overall dimensions and configuration of the couplers 96, 100 may vary, depending upon the particular shape and size of the first and second fittings 90, 92, to which the couplers 96, 100 are respectively attached, as will be discussed in greater detail below. In FIG. 4, each of the first and second linear-to-rotary adaptors 54, 56 is shown in two parts. However, it should be understood that this is for illustrative purposes only, specifically to best illustrate the slots 60, 62, 68, 70, and the first and second linear-to-rotary adaptors 54, 56 may be manufactured integrally as one-piece bodies.

Returning to FIG. 3, the first and second linear-to-rotary adaptors 54, 56 are rotatably mounted within the main housing tube 12, and the first and second linear-to-rotary adaptors 54, 56 are positioned on opposite sides of the slider 40, as shown. The linear movement of the cylindrical slider 40 within the linear motion tube 14 drives rotation of the first and second linear-to-rotary adaptors 54, 56 through the relative movement of the rollers 74, 76, 82 (and the fourth roller, not shown, positioned opposite roller 76 in FIG. 4) in the tracks 60, 62, 68, 70.

As shown in FIGS. 2 and 3, first and second annular caps 30, 28 are respectively secured to opposed first and second open ends 39, 37 of the main housing tube 12. Each of the first and second annular caps 30, 28 has a central opening formed therein for rotatably receiving a corresponding one of the couplers 96, 100 of each of the first and second linear-to-rotary adaptors 54, 56, respectively. Although it should be understood that the first and second annular caps 30, 28 may be respectively secured to the first and second open ends 39, 37 of the main tube 12 using any suitable method of attachment, in the example of FIG. 2, the first annular cap 30 is shown with circumferential locking members 34 engaging openings 38 to form a "boltless" connection, such as that described in U.S. Pat. Nos. 9,103,419 and 10,041,572, and similarly, the second annular cap 28 is shown with circumferential locking members 32 engaging openings 36 to form a similar "boltless" connection.

As noted above, and as shown in FIG. 5, first and second fittings 90, 92 are secured to the couplers 96, 100 of the first and second linear-to-rotary adaptors 54, 56, respectively. Although it should be understood that first and second fittings 90, 92 may be secured to the couplers 96, 100 of the first and second linear-to-rotary adaptors 54, 56, respectively, using any suitable method of attachment, in the example of FIG. 5, the first fitting 90 is shown with circumferential locking members 94 engaging openings 98 formed in coupler 96 to form a "boltless" connection, such as that described in U.S. Pat. No. 9,103,419 (see FIGS. 1A and 1B and the text at col. 3, line 32 through col. 4, line 18) and U.S. Pat. No. 10,041,572, and as further described below in FIGS. 6A and 6B. Similarly, the second fitting 92 is shown with circumferential locking members 102 engaging openings 104 formed in coupler 100 to form a similar "boltless" connection.

Figure 5:
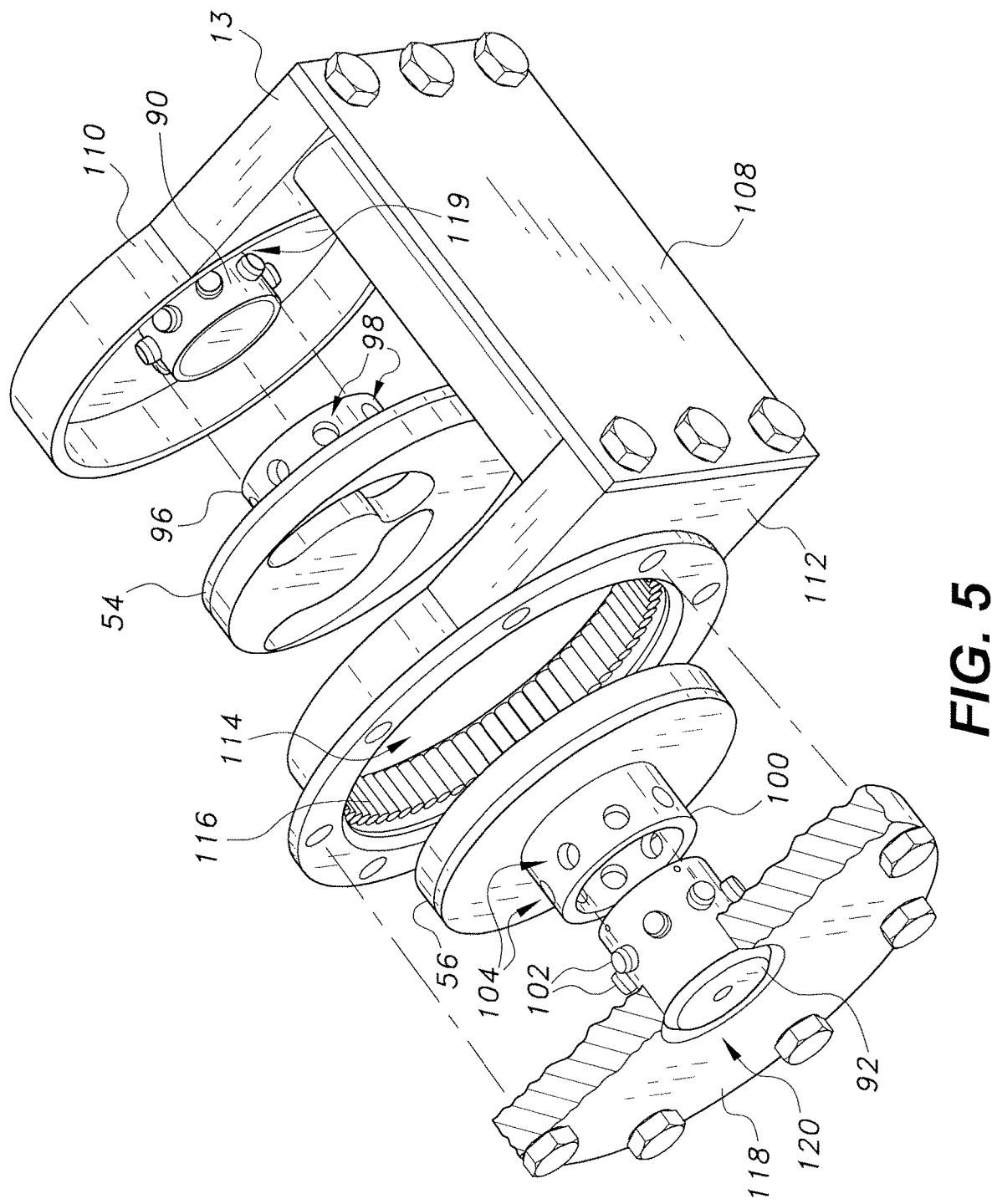
FIG. 5 is a partially exploded perspective view of the housing and rotor assembly of the linear-to-rotary actuator of FIG. 1A with the base rotor broken away to show details thereof.

As shown in FIGS. 1A, 1B and 5, the first fitting 90 is attached to the outer wall 110 of the saddle rotor 13 and extends through the opening in the cap 28 into the main tube 12 to attach to the coupler 96, and the second fitting 92 is attached to the base rotor 118 and extends through the opening in the cap 30 to attach to the coupler 100. As shown in the example of FIG. 5, the medial wall 112 has an annulus 114 defined therein dimensioned and configured to surround the main tube 12 so that the saddle rotor 13 may rotate around the main tube 12. The annulus 114 may be lined with roller bearings 116 to permit smooth rotation of the saddle rotor 13 around the main tube 12. The base rotor 118 and the saddle rotor 13 each may have a load attached thereto for rotation through the same angle or for rotation through two different angles at a defined angular displacement.

Figure 6A:
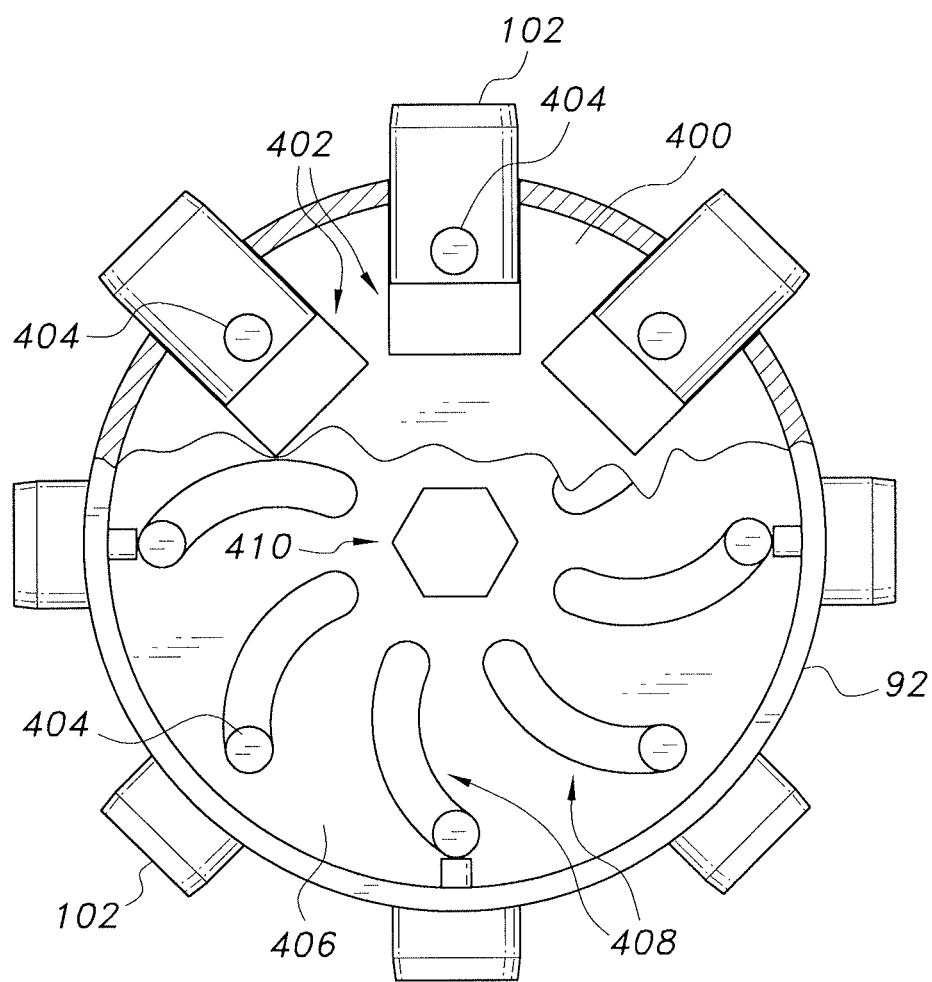
FIG. 6A is a front view of the second fitting, shown with the rotatable disk broken away to show details thereof.
Figure 6B:
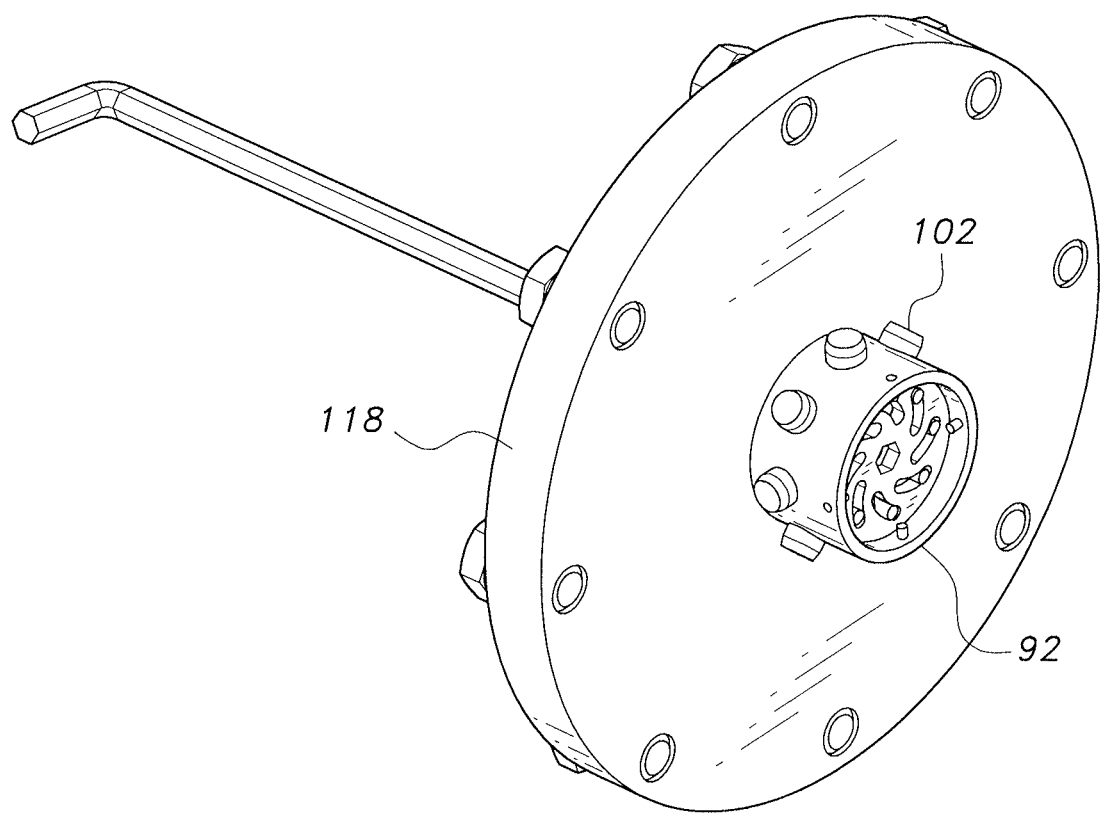
FIG. 6B is a perspective view of the second fitting, shown with a tool for selectively extending and retracting the lock members.

The "boltless" connection between coupler 100 and the second fitting 92 is explained further with reference to FIGS. 6A and 6B. The second fitting 92 houses a solid block 400 of material having a plurality of radially extending guide channels 402 defined therein. The locking members 102 are constrained to linear sliding movement in the guide channels 402. Each of the locking members 102 has a follower 404 extending transversely therefrom, the follower 404 being a cylindrical post or a roller. A rotatable disk 406 covers the block 400 defining the guide channels 402. The rotatable disk 406 has a plurality of guide curves 408 defined therein, the followers 404 each extending through a corresponding guide curve 408. Each guide curve 408 may define an arc of an Archimedean spiral. When the disk 406 is rotated, the followers 404 are constrained to slide or roll in their corresponding guide curve 408, and the corresponding lock members 102 either extend from the second fitting 92 to engage the openings 104 in the coupler 100 to lock the base rotor 118 to the second linear-to-rotary adaptor 56, or retract the lock members 102 into the guide channels 402 to decouple the base rotor 118 from the second linear-to-rotary adaptor 56. As shown in FIGS. 6A-6B, the disk 406 may have a central aperture 410 defined therein, e.g., a hexagonal opening, configured for engagement by a suitable tool, such as an Allen wrench, for selectively coupling and decoupling the base rotor 118 from the second linear-to-rotary adaptor 56.

A similar "boltless" connector is used to couple and decouple the coupler 96 of the first linear-to-rotary adaptor 54 with the fitting 90 of the saddle rotor 13. A similar arrangement of guide curves and slidable lock members is used for boltless connection of the linear actuator 18 to the linear motion tube 14 and of the annular caps 30, 28 to the main tube 12, but with the rotatable disk 406 replaced by a rotatable annular ring.

Figure 7:
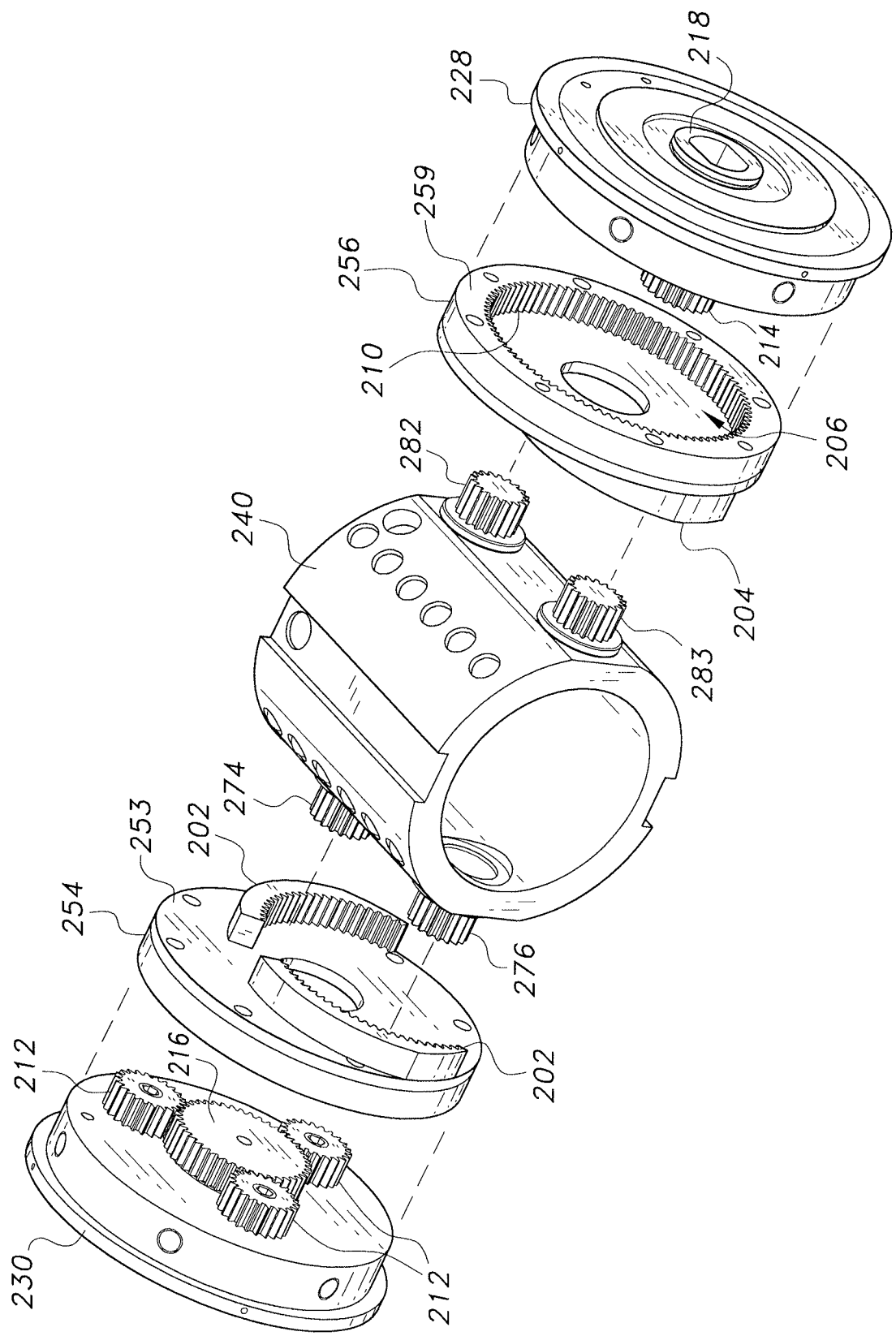
FIG. 7 is a partially exploded perspective view of an alternative embodiment of a slider and rotor assembly of the linear-to-rotary actuator of FIG. 1A.

In the alternative embodiment of FIG. 7, the driven rotation of the first and second linear-to-rotary adaptors 54, 56 through engagement of the rollers with the corresponding slots 60, 62, 68, 70 of the previous embodiment is replaced by a gear assembly. In this embodiment, the at least two rollers of the previous embodiment are replaced by at least two diametrically opposed drive gears extending from the cylindrical shell 240. In the embodiment of FIG. 7, two such gears 282, 283 are shown rotatably mounted on one side of the cylindrical shell 240, and a corresponding pair of gears 274, 276 is shown rotatably mounted on the other side (i.e., diametrically opposite side) of the cylindrical shell 240. In this embodiment, the actuator disk of each of the first and second linear-to-rotary adaptors has at least one toothed arcuate member or rack gear mounted thereon (replacing the at least one slot of the previous embodiment) for engaging a corresponding at least one of the at least two diametrically opposed drive gears. Thus, in the example of FIG. 7, in which two gears are mounted on either side of the cylindrical shell 240, the second linear-to-rotary adaptor 254 has a corresponding pair of toothed arcuate members 202 (rack gears) mounted on a face 253 thereof. Similarly, the first linear-to-rotary adaptor 256 has a corresponding pair of toothed arcuate members 204 (rack gears) mounted thereon (although only one can be seen in FIG. 7). The opposite face of the first and second linear-to-rotary adaptors 256, 254 has a recess defined by an annular flange, where the annular flange defines a ring gear. In FIG. 7, only recess 206, defined in annular flange 259 of the first linear-to-rotary adaptor 256, can be seen (with internal ring gear 210). However, it should be understood that the second linear-to-rotary adaptor 254 has a similar recess and internal ring gear.

Similar to the previous embodiment, the first and second linear-to-rotary adaptors 256, 254 are rotatably mounted within the main tube 12 of the housing 15 on opposite sides of the cylindrical slider 40. As in the previous embodiment, linear movement of the cylindrical shell 240 drives rotation of the first and second linear-to-rotary adaptors 256, 254. However, the rotation of the first and second linear-to-rotary adaptors 256, 254 is driven in this embodiment by engagement of the drive gears 274, 276, 282, 283 with the arcuate rack gears 202, 204.

As in the previous embodiment, first and second caps 228, 230 are respectively secured to opposed first and second open ends 37, 39 of the main tube 12 of the housing 15. However, a first face of each of the first and second caps has an internal gear train mounted thereto. In FIG. 7, a plurality of spaced intermediate gears 212 are driven by the ring gear 210 and drive a central output gear 216, which has an output shaft 218 attached thereto that is rotatably mounted in a bearing in the corresponding end cap 228, 230. Although three such intermediate gears 212 are shown, it should be understood that any suitable number may be used. In FIG. 7, only a single intermediate gear 214 can be seen attached to first annular cap 228, although it should be understood that first annular cap 228 also has a similar full gear train mounted thereon. By adjusting the gear ratios of the intermediate gears 212, 214 to the driven output gear 216, the angular displacement of the base rotor 118 and the saddle rotor 13 may be precisely adjusted.

It is to be understood that the linear-to-rotary actuator is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A linear-to-rotary actuator, comprising:
a housing including an elongated main tube having opposing ends and an elongated linear motion tube having opposing ends, the linear motion tube intersecting the main tube orthogonally between the opposing ends of the main tube;
a linear actuator having a cylinder disposed in one of the ends of the linear motion tube and a piston selectively extendable and retractable within the linear motion tube;
a cylindrical slider attached to the piston of the linear actuator, the slider being slidable in the linear motion tube between the opposing ends of the linear motion tube;
first and second linear-to-rotary adaptors disposed in the main tube on opposite sides of the slider, respectively, each of the adaptors being a disk having a first face having at least one arcuate track defined therein and an opposing face having an output flange attached thereto, each of the output flanges having a coupler extending therefrom;
at least one pair of coaxially mounted rollers extending from opposite sides of the slider, at least one of the rollers engaging one of the tracks so that linear motion of the slider is converted to rotary motion of at least one of the linear-to-rotary adaptors;
a base rotor having a fitting selectively attached to the coupler of the first linear-to-rotary adaptor, the base rotor being mounted at one of the ends of the main tube and adapted for attachment of a first load thereto; and
a second rotor having a fitting selectively attached to the coupler of the second linear-to-rotary adaptor, the second rotor being mounted at the end of the main tube and adapted for attachment of a second load thereto;
wherein the linear-to-rotary actuator may be configured to rotate the first and second loads through the same angle and the linear-to-rotary actuator may be configured to rotate the first and second loads through a defined angular displacement;
wherein said second rotor comprises a saddle rotor having an outer wall, a medial wall, and an intermediate wall connecting the outer wall and the medial wall, the saddle rotor defining a U-shape, the medial wall having an annulus defined therein dimensioned and configured for rotation around the main tube, the saddle rotor having a plurality of roller bearings lining the annulus to smooth rotation around the main tube.

2. The linear-to-rotary actuator according to claim 1, wherein the medial wall of said saddle rotor has a plurality of threaded bores defined therein, the linear-to-rotary actuator further comprising a plurality of threaded fasteners extending through said base rotor and engaging the threaded bores in the medial wall to constrain said base rotor and said saddle rotor to rotate as a unit through the same angular arc.

3. The linear-to-rotary actuator according to claim 1, wherein said at least one pair of coaxially mounted rollers comprises two pairs of coaxially mounted rollers spaced apart on said slider, said at least one arcuate track comprising two arcuate tracks defined in each of said linear-to-rotary adaptors, at least one of the rollers comprising two rollers engaging the two tracks in each of the adaptors, respectively.

4. The linear-to-rotary actuator according to claim 1, wherein the at least one arcuate track defined in said second linear-to-rotary adaptor is equal in angular measure to the at least one arcuate track defined in said first linear-to-rotary adaptor, whereby angular displacement between sad base rotor and said second rotor is double the angular displacement of arcuate tracks extending in the same direction.

5. The linear-to-rotary actuator according to claim 1, wherein:
each said coupler comprises a cylindrical shell having a plurality of spaced apertures defined therein; and each said fitting comprises a cylinder having radially spaced lock members extendable and retractable therefrom, the lock members selectively engaging the apertures when extended to couple the linear-to-rotary adaptors to the corresponding said rotors.

6. The linear-to-rotary actuator according to claim 5, wherein each said fitting comprises:
- a solid block within the fitting cylinder, the solid block having a plurality of radially extending guide channels defined therein, each said lock member being slidably disposed with a corresponding one of the guide channels, each of said lock members having a follower extending transversely therefrom; and
- a rotatable disk adjacent the solid block, the rotatable disk having a plurality of guide curves defined therein, each of the followers extending through a corresponding one of the guide curves so that when the disk is rotated, the follower is constrained to slide in the guide curve, thereby extending or retracting the corresponding lock members, the disk having a central aperture defined therein configured for receiving a tool adapted for rotating the rotatable disk.

7. The linear-to-rotary actuator according to claim 6, wherein each said guide curve defines an arc of an Archimedean spiral.

8. The linear-to-rotary actuator according to claim 1, wherein each said track defined in each said linear-to-rotary adaptor defines an arc of an Archimedean spiral.

9. The linear-to-rotary actuator according to claim 1, wherein said base rotor comprises a circular disk.

10. The linear-to-rotary actuator according to claim 1, further comprising:
- at least one keyway defined in said cylindrical slider; and
- at least one key attached to said linear motion tube, the at least one key engaging the at least one keyway to prevent rotation of said cylindrical slider in said linear motion tube.

\* \* \* \* \*